(12) United States Patent
Kneidel

(10) Patent No.: US 6,326,095 B1
(45) Date of Patent: Dec. 4, 2001

(54) INTEGRATED MANIFOLD/REFORMER FOR FUEL CELL SYSTEMS

(75) Inventor: Kurt E. Kneidel, Alliance, OH (US)

(73) Assignee: Sofco L.P., New Orleans, LA (US)

( * ) Notice: Subject to any disclaimer, the term of this patent is extended or adjusted under 35 U.S.C. 154(b) by 0 days.

(21) Appl. No.: 09/459,504

(22) Filed: Dec. 13, 1999

(51) Int. Cl.[7] .................................................. H01M 8/06
(52) U.S. Cl. .................................................. 429/19; 429/34
(58) Field of Search .................................. 429/19, 20, 34, 429/38, 39

(56) References Cited

U.S. PATENT DOCUMENTS

| | | | |
|---|---|---|---|
| 4,128,700 | * 12/1978 | Sederquist | 429/20 X |
| 5,660,941 | * 8/1997 | Farooque et al. | 429/19 |
| 5,725,964 | * 3/1998 | Huppmann | 429/20 |
| 6,146,780 | * 11/2000 | Cisar et al. | 429/34 |

FOREIGN PATENT DOCUMENTS 5-190188 * 7/1993 (JP) .
9-231987 * 9/1997 (JP) .

* cited by examiner

Primary Examiner—Stephen Kalafut
(74) Attorney, Agent, or Firm—R. C. Baraona; Eric Marich

(57) ABSTRACT

A fuel cell manifold arrangement includes a fuel cell stack and a manifold enclosure connected to and sealed to an inlet side of the fuel cell stack and defining with the stack a gas plenum for receiving a fuel gas for the fuel cell stack. A catalyst screen is connected to the manifold enclosure for defining a gas passage for passing fuel gas and for containing a catalyst that is bounded by the screen. The manifold enclosure has a gas inlet for receiving fuel gas, the gas inlet communicating with the screen for passing fuel gas through the screen and past the catalyst. A plate in the manifold enclosure separates the catalyst from the plenum and heat insulation is on at least part of the manifold enclosure and on at least part of the plate for insulating the manifold enclosure from the fuel cell stack and from an exterior of the manifold enclosure. A passage in the manifold enclosure connects the screen to the plenum for passing fuel gas from the catalyst to the plenum.

7 Claims, 3 Drawing Sheets

INTEGRATED MANIFOLD/REFORMER FOR FUEL CELL SYSTEMS

FIELD AND BACKGROUND OF THE INVENTION

The present invention relates in general to solid oxide fuel cells, and in particular, to a new and useful integrated manifold/reformer for solid oxide fuel cells.

Fuel cells are widely recognized as one of the most promising technologies to meet future power generation requirements, particularly for distributed power applications. Of the various fuel cells under development, planar Solid Oxide Fuel Cells (SOFCs) are particularly attractive because of their solid state construction (no liquid electrolyte). The ability to be integrated into compact, rugged power systems fueled with readily available fossil fuels is also an important advantage. The development and commercialization of planar SOFC technology requires innovative approaches to system design that allow integration into compact power systems.

FIG. 1 illustrates the component arrangement used in a known SOFC system of a nominal 1 kilowatt (kW) size. Before operation, a refractory-insulated hood (not shown) is lowered over the equipment, forming a hot chamber 100. The components normally operate at about 850° C. Of interest here are the flow of the fuel gas through the system and the energy transfers between the fuel cells in fuel cell stack 102, reformer 104, and chamber 100. Typical values from that known design are used in the following description for quantification.

Natural gas is a popular choice for fuel. For a 2-kilowatt size, about 1 pound/hr of natural gas is mixed with about 2.2 pounds/hr of steam to form the fuel gas 108. This mixture flows up from an insulated base plate 106, as shown, into the reformer 104. The reformer 104 is typically filled with a steam reforming catalyst made from a nickel metal base. The catalyst changes the composition of the gas by way of certain chemical reactions. The chemical reactions taking place in the reformer 104 are endothermic so the reformer 104 absorbs about 2.4 kilowatts of heat from the components in the hot chamber 100. The fuel gas flowing out of the reformer 104 at 108 is at about 790 EC and includes about 1.1 pound/hr of steam, 1.7 pounds/hr of carbon monoxide, and 0.4 pound/hr of hydrogen.

The reformed fuel flows out the top of the reformer through an insulated tube 110 to the inlet fuel manifold 112. The manifold seals around the perimeter of the fuel cell stack 102 and forces the fuel gas to flow through channels in the stack interconnects (right to left). The manifold also acts as a plenum to supply the fuel gas evenly to the fuel cells. The fuel cell stack 102 is also supplied with air, which flows from back to front in FIG. 1. The fuel cell stacks use about 60% of the energy in the fuel gas to produce 2 kilowatts of electric power. In this process, about 3.9 kilowatts of heat is released in the stacks. This heat is removed from the stacks in two ways. One way is to transfer heat to the airflow. The other way is to transfer heat to other components in the chamber, primarily by radiation. Since the fuel cell stacks are generating excess heat and the reformer requires heat input, the stacks are relatively hotter than the reformer. Consequently, the reformer draws heat from the stacks, preferentially from stacks, or stack surfaces that are near to it.

The partially used fuel gas leaving the fuel cell stacks is gathered in the outlet fuel manifold 114 and exhausts through a tube 116 as shown. At this point, any unused fuel burns in a flame as it enters the hot chamber.

SUMMARY OF THE INVENTION

The present invention is a new fuel inlet manifold that performs all the functions of the prior manifold, as well as the functions of the reformer, which results in a compact power system.

The compactness of a fuel cell power system is very important from a commercial standpoint. In addition to how much room is needed for an installation, indirect effects on system costs due to size and system heat losses are important. The present invention allows a significant reduction in size. This can be seen easily by referring to FIG. 1. By roughly doubling the thickness of the inlet fuel manifold shown, the reformer and tubing connecting it to the manifold is eliminated according to the present invention. The size of the insulated base and hood can be significantly reduced.

Another advantage is that the fuel gas plumbing is simpler. According to the invention the mixture of natural gas and steam flows directly into the manifold rather than into the reformer.

The relatively large amount of heat absorbed from the hot chamber by the reformer presents a significant design problem. In larger systems (2-kilowatts or more), multiple fuel cell stacks are needed to produce the electric power. In the prior art, the reforming process would be done in one reformer. However, the reformer is a heat sink that draws heat unevenly from the chamber and stacks. Stacks located closer to the reformer lose more heat and tend to operate at a lower temperature. This unbalances power production by the stacks and can affect stack life. This problem is eliminated with this invention. Each stack has its own, identical reformer located in the inlet fuel manifold. Consequently, every stack sees the same environment and stack temperatures are balanced.

In the prior art, the reformer absorbed heat by direct thermal radiation from the stacks and also from the hot chamber, either by radiation from other components or by convection from the gas inside the chamber. Controlling the relative amounts of heat is usually desirable in the design process yet is very difficult due to the complex heat transfer mechanisms and geometry of the components in the chamber. For example, it is usually desirable to remove as much heat directly from the stacks as possible because this lessens the requirement for airflow. Less airflow means smaller blowers, less exhaust heat loss, etc. The integrated manifold/reformer also absorbs heat from both the fuel cell stack and the chamber. However, the relative amounts can be easily controlled in the design process through the placement of insulation outside or inside the manifold according to this invention.

The integrated manifold/reformer also allows for a customized heat input distribution from the stack bottom to top. In this way, the heat sink seen by the stack can be adjusted to account for heat losses out the top and bottom of the stack to give a uniform vertical stack temperature profile.

Accordingly another object of the present invention is to provide a fuel cell manifold arrangement, comprising a fuel cell stack having a fuel gas inlet side and a fuel gas outlet side; a manifold enclosure connected to and sealed to the inlet side of the fuel cell stack and defining with the stack a gas plenum for receiving a fuel gas for inlet into the inlet side of the fuel cell stack; catalyst screen means connected to the manifold enclosure for defining a gas passage for passing fuel gas and for containing a catalyst; a fuel gas catalyst in the manifold enclosure and bounded by the screen means; the manifold enclosure having a gas inlet for receiving fuel gas, the gas inlet communicating with the screen means for passing fuel gas through the screen means and past the catalyst in the gas passage; plate means in the manifold enclosure for separating the catalyst from the plenum; heat insulation on at least part of the manifold enclosure and on at least part of the plate means for insulating the manifold enclosure from the fuel cell stack and from an exterior of the manifold enclosure; and passage means in the manifold enclosure for defining a passage from the screen means to the plenum for passing fuel gas from the catalyst to the plenum.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiment of the invention is illustrated.

DESCRIPTION OF THE PREFERRED EMBODIMENT

Figure 1:
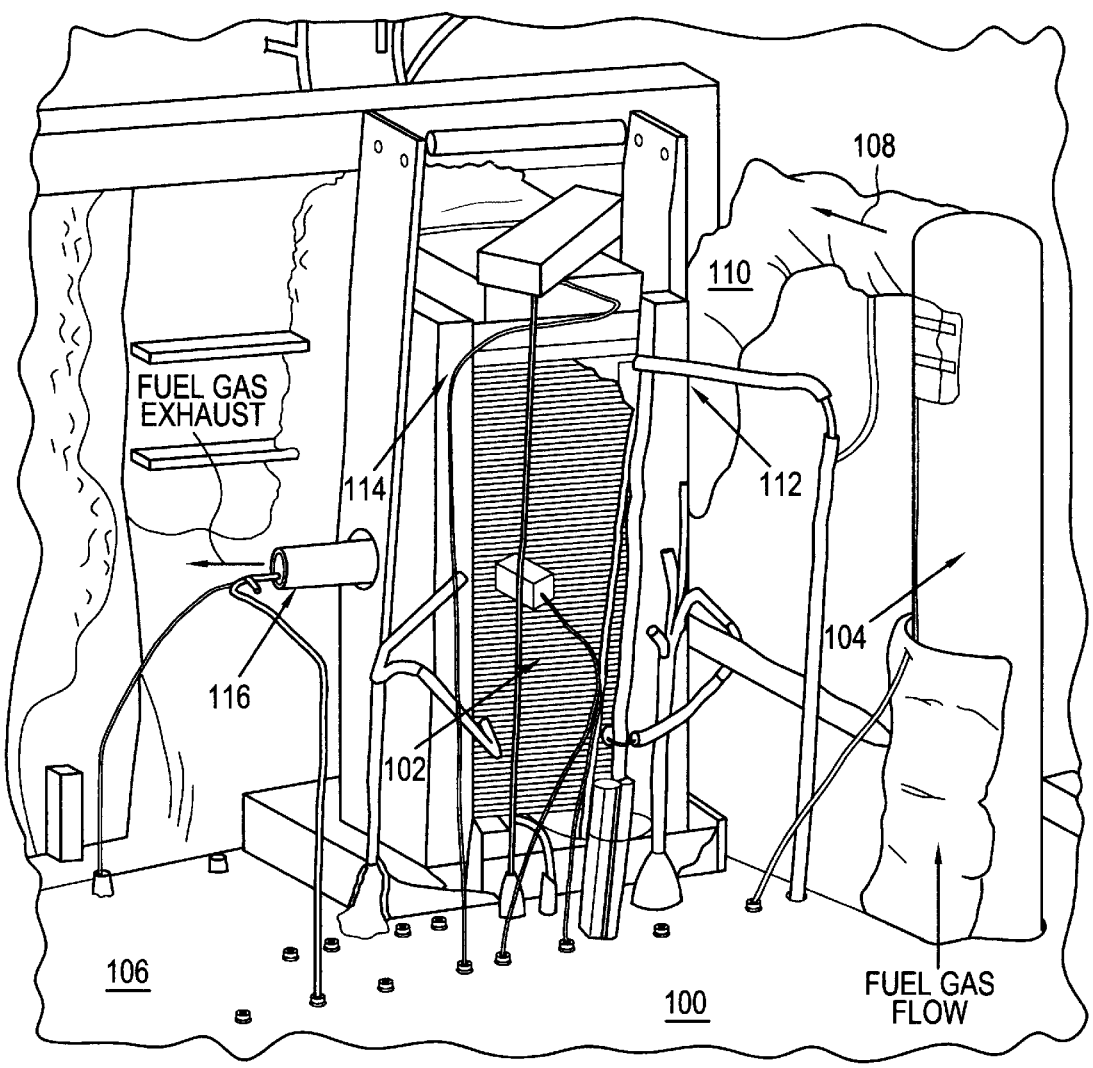
FIG. 1 is a schematic representation showing a fuel cell system of the prior art.
Figure 2:
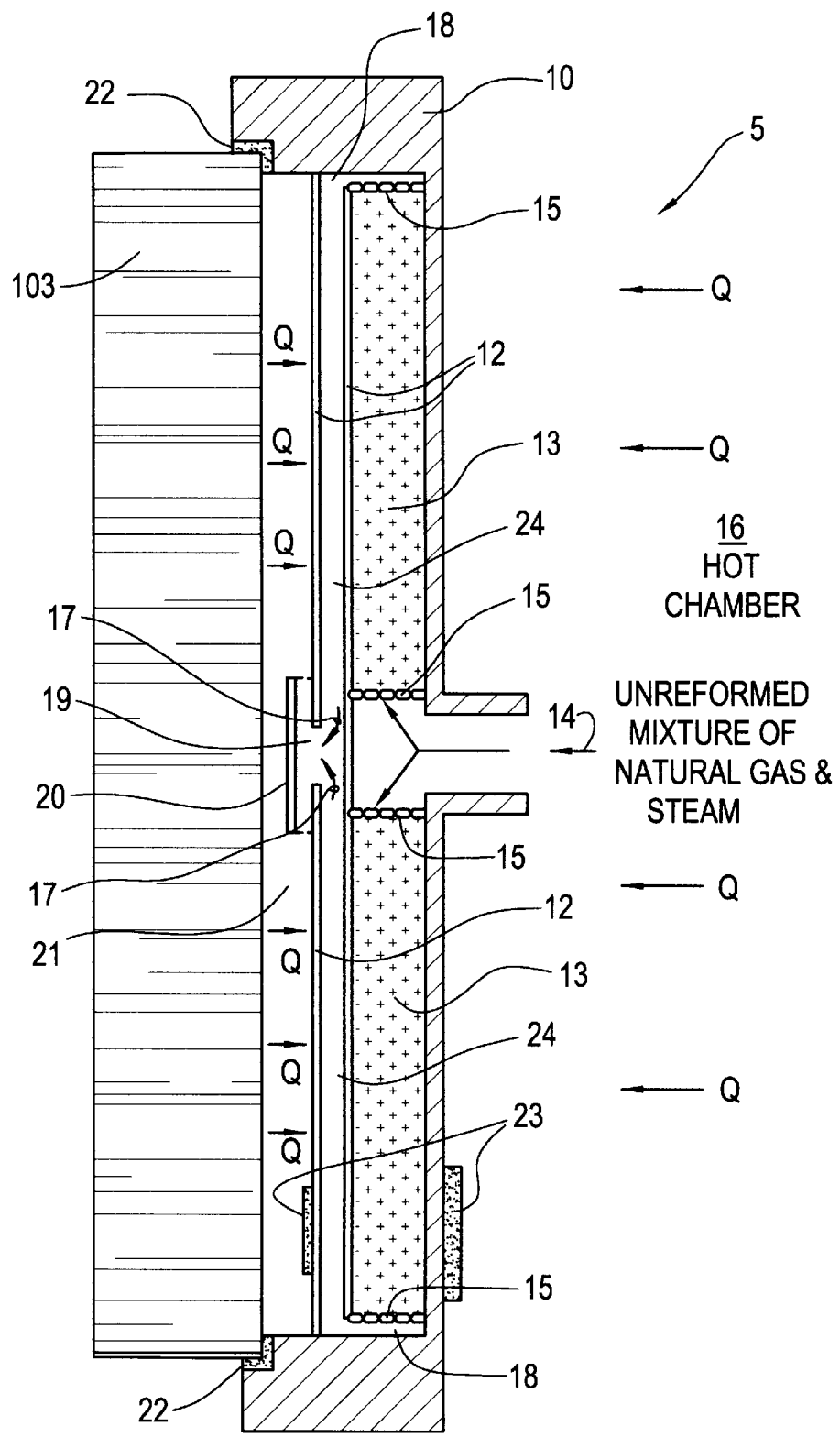
FIG. 2 is sectional view of one embodiment of the fuel cell manifold arrangement of the present invention.

Referring to the drawings generally, wherein like reference numerals designate the same or functionally similar elements throughout the several drawings, and to FIG. 2 in particular, there is illustrated one arrangement of the present invention, an integrated manifold/reformer generally designated 5. A manifold enclosure 10 for a fuel cell stack 103 is made deeper to allow plates or baffles 12, etc., to create a flow path and contain a steam reforming catalyst 13. The manifold enclosure 10 is sealed to the stack 103 with a gasket 22 as in the prior art. In the configuration shown, the gas 14 (an unreformed mixture of natural gas and steam) enters from the right at substantially the vertical center of the manifold enclosure 10. The gas 14 splits and flows both up and down through the bed of catalyst 13. Screens 15 are used to constrain the catalyst 13 in between the plates or baffles 12 and the manifold enclosure 10. Heat Q from both a hot chamber 16 and also heat Q from the fuel cell stack 103 supplies the endothermic reaction. The gas mixture 14 is reformed as it flows towards the ends 18 of the manifold enclosure 10 where it is turned back and flows through a second passage 24 toward the center portion thereof. This second passage 24 may contain additional catalyst 13, if needed. The reformed gas 17 flows through a small passage 19, hits a deflector 20, and is then supplied to a plenum 21 which provides a uniform gas supply to the stack 103. Insulation 23 may be used on any surface to help regulate the flow of heat to control the reforming rate and the relative amount of heat Q supplied by the stack 103 and hot chamber 16.

This invention has the advantages over the prior art described above. These advantages can be used to create a better solid oxide fuel cell power system with a unique feature that distinguishes systems made with this invention over other known systems.

Many alternative configurations are possible for the integrated manifold/reformer 5. Other internal flow geometries could be used to vary the heating rate of the fuel gas 14, vary the axial heat transfer variation from the fuel cell stack 103, or to incorporate different amounts or sizes of catalysts 13. Insulation 23 placement can be varied to adjust relative heat inputs Q from the hot chamber 16 and the stack 103 as well as the axial profiles of heat Q distribution. Radiation shields could be used instead of thermal insulation 23 to reduce local heat transfer rates. Various types of catalysts, reforming processes, or fuel gases can be used.

Figure 3:
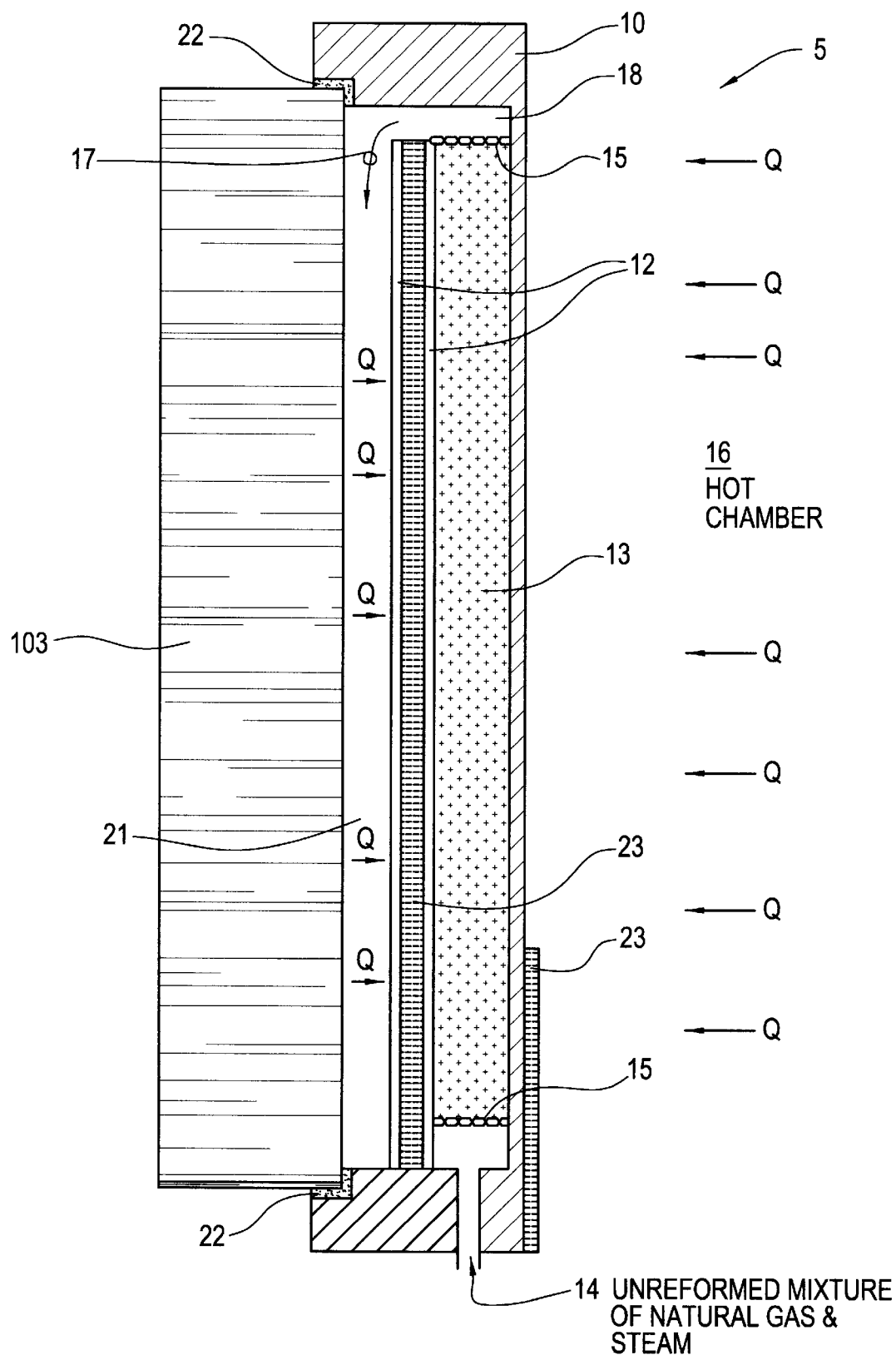
FIG. 3 is sectional view of another embodiment of the fuel cell manifold arrangement of the present invention.

FIG. 3 shows an alternative embodiment of the present invention; like numerals designate the same or functionally similar structures. FIG. 3 illustrates a simpler design of the integrated manifold/reformer 5 than that shown in FIG. 2. This configuration would be used in a situation where it is desirable to have all reforming heat Q taken from the hot chamber 16. To accomplish this, insulation 23 is placed between the catalyst 13 and fuel cell stack 103 to eliminate most of the heat Q from the stack 103. Insulation 23 is also placed outside the manifold enclosure 10 as shown to reduce the initial fuel gas 14 heating rate. The flow passage is a simple one-pass configuration where the gas 14 flows from the inlet through the bed of catalyst 13 where it is reformed into reformed fuel gas 17 for the stack 103, and flows towards end 18 of the manifold enclosure 10 and then into the plenum region 21. This allows simple fuel gas plumbing with fuel gas 14 coming up through the base directly into the integrated manifold/reformer 5.

While a specific embodiment of the invention has been shown and described in detail to illustrate the application of the principles of the invention, it will be understood that the invention may be embodied otherwise without departing from such principles.

I claim:

1. A fuel cell manifold arrangement, comprising:
   a fuel cell stack having a fuel gas inlet side and a fuel gas outlet side;
   a manifold enclosure connected to and sealed to the inlet side of the fuel cell stack and defining with the stack a gas plenum for receiving a fuel gas for inlet into the inlet side of the fuel cell stack;
   a catalyst screen connected to the manifold enclosure for defining a gas passage for passing fuel gas and for containing a catalyst;
   a fuel gas catalyst in the manifold enclosure and bounded by the screen;
   the manifold enclosure having a gas inlet for receiving fuel gas, the gas inlet communicating with the screen for passing fuel gas through the screen and past the catalyst in the gas passage;
   a plate in the manifold enclosure for separating the catalyst from the plenum;
   heat insulation on at least part of the manifold enclosure and on at least part of the plate for insulating the manifold enclosure from the fuel cell stack and from an exterior of the manifold enclosure; and
   a passage in the manifold enclosure extending from the screen to the plenum for passing fuel gas from the catalyst to the plenum.

2. The fuel cell manifold arrangement according to claim 1, including a gasket between the manifold enclosure and the fuel cell stack.

3. The fuel cell manifold arrangement according to claim 1, including a baffle plate spaced between the plate and the plenum for separating the stack from the catalyst.

4. The fuel cell manifold arrangement according to claim 3, wherein the baffle plate has an opening therein for passing fuel gas from the catalyst to the plenum and a deflector plate in the plenum and over the opening.

5. The fuel cell manifold arrangement according to claim 3, wherein the gas inlet is in fluidic contact with a centermost portion of the catalyst and wherein the screen includes a first screen around the gas inlet and a second screen around the catalyst, both the first and second screens being in communication with the gas passage.

6. The fuel cell manifold arrangement according to claim 3, including insulation in the space between the plate and the baffle plate, the gas inlet being at one end of the catalyst and the passage to the plenum being at an opposite end of the catalyst.

7. The fuel cell manifold arrangement according to claim 1, including additional catalyst in the passage for passing fuel gas from the catalyst to the plenum.

* * * * *